(12) United States Patent
Tremblay

(10) Patent No.: US 7,360,028 B1
(45) Date of Patent: Apr. 15, 2008

(54) EXPLICIT STORE-TO-INSTRUCTION-SPACE INSTRUCTION FOR SELF-MODIFYING CODE AND ENSURING MEMORY COHERENCE BETWEEN INSTRUCTION CACHE AND SHARED MEMORY USING A NO-SNOOP PROTOCOL

(75) Inventor: Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/565,976

(22) Filed: May 5, 2000

(51) Int. Cl.
*G06F 12/00* (2006.01)
(52) U.S. Cl. ........................... 711/141; 712/226
(58) Field of Classification Search ............ 712/1, 712/216, 226, 227, 220; 711/141, 146
See application file for complete search history.

(56) References Cited

U.S. PATENT DOCUMENTS

| | | | | | |
|---|---|---|---|---|---|
| 4,713,755 | A | * | 12/1987 | Worley et al. | 711/123 |
| 4,991,078 | A | * | 2/1991 | Wilhelm et al. | 712/218 |
| 4,992,934 | A | * | 2/1991 | Portanova et al. | 712/209 |
| 5,113,514 | A | * | 5/1992 | Albonesi et al. | 711/144 |
| 5,301,287 | A | * | 4/1994 | Herrell et al. | 711/202 |
| 5,568,624 | A | | 10/1996 | Sites et al. | |
| 5,745,707 | A | * | 4/1998 | Takahashi | 710/110 |
| 5,764,938 | A | * | 6/1998 | White et al. | 712/200 |
| 5,826,073 | A | * | 10/1998 | Ben-Meir et al. | 712/226 |
| 5,835,949 | A | * | 11/1998 | Quattromani et al. | 711/135 |
| 6,021,261 | A | * | 2/2000 | Barrett et al. | 714/37 |
| 6,148,399 | A | * | 11/2000 | Lyke | 712/10 |
| 6,567,426 | B1 | * | 5/2003 | van Hook et al. | 370/535 |
| 6,594,734 | B1 | * | 7/2003 | Kyker et al. | 711/146 |

OTHER PUBLICATIONS

Shanley, Tom, Pentium Pro Processor System Architecture, Copyright 197, Addison-Wesley Developers Press, pp. 126-127 and 150-151.*
Hennessy and Patterson, "Computer Architecture—A Quantitative Approach, 2nd Edition," 1996, pp. 657-660.*
Tom R. Halfhill; "Intel Network Processor Targets Routers: IXP1200 Integrates Seven Cores for Multithreaded Packet Routing"; *Microprocessor Report: The Insiders' Guide To Microprocessor Hardware*; vol. 13, No. 12; Sep. 13, 1999; 6 pages. (Copy Enclosed).
Marc Tremblay and William Joy; *A Multiple-Thread Processor For Threaded Software Applications*; U.S. Appl. No. 09/204,480; filed Dec. 3, 1998. (Copy Not Enclosed).
Linley Gwenap; "MAJC Gives VLIW A New Twist," *Microprocessor Report: The Insiders' Guide To Microprocessor Hardware*; vol. 13, No. 12; Sep. 13, 1999; 6 pages. (Copy Enclosed).

* cited by examiner

*Primary Examiner*—David J. Huisman
(74) *Attorney, Agent, or Firm*—Darby & Darby P.C.; M. David Ream

(57) ABSTRACT

A method and apparatus for performing a store-to-instruction-space instruction are provided. A unique opcode indicates that a data value is to be written to an instruction space in main memory. The instruction is received and executed. After the instruction space is modified to contain the data value, further processing is performed to ensure coherence between main memory and an instruction cache.

23 Claims, 5 Drawing Sheets

500

EXPLICIT STORE-TO-INSTRUCTION-SPACE INSTRUCTION FOR SELF-MODIFYING CODE AND ENSURING MEMORY COHERENCE BETWEEN INSTRUCTION CACHE AND SHARED MEMORY USING A NO-SNOOP PROTOCOL

BACKGROUND OF THE INVENTION

1. Field of the Invention

The present invention relates generally to microprocessors, and more particularly, to an STI instruction that explicitly indicates that a store instruction is being utilized to modify instruction space in a computer system.

2. Description of the Related Art

The present invention relates to two concepts discussed herein: multiple-thread processing and instruction sets. Regarding multiple-thread processing, an automated system for various processing applications may handle multiple events or processes concurrently. A single process is termed a thread of control, or "thread", and is the basic unit of operation of independent dynamic action within the system. A program has at least one thread. A system performing concurrent operations typically has many threads, some of which are transitory and others enduring. Single-processor systems can only have illusory concurrent threads, typically attained by time-slicing of processor execution, shared among a plurality of threads. Systems that execute among multiple processors allow for true concurrent threads.

Some programming languages are particularly designed to support multiple-threading. One such language is the Java™ programming language that is advantageously executed using an abstract computing machine, the Java Virtual Machine™. A Java Virtual Machine™ is capable of supporting multiple threads of execution at one time. The multiple threads independently execute Java code that operates on Java values and objects residing in a shared main memory. The multiple threads may be supported using multiple hardware processors, by time-slicing a single hardware processor, or by time-slicing many hardware processors. In 1990 programmers at Sun Microsystems developed a universal programming language, eventually known as "the Java™ programming language". Java™, Sun, Sun Microsystems and the Sun Logo are trademarks or registered trademarks of Sun Microsystems, Inc. in the United States and other countries. All SPARC trademarks, including UltraSPARC I and UltraSPARC II, are used under license and are trademarks of SPARC International, Inc. in the United States and other countries. Products bearing SPARC trademarks are based upon an architecture developed by Sun Microsystems, Inc.

SUMMARY OF THE INVENTION

The present invention provides an explicit instruction for the implementation of self-modifying code. In one embodiment, an STI instruction is provided for a microprocessor that supports the use of data and instruction caches in a multi-thread processing environment.

At least one embodiment provides a method to implement a processor instruction. The method includes receiving a store-to-instruction-space ("STI") instruction where the instruction includes an opcode, a storage data register specifier that specifies a register containing a datum to be stored to instruction space. The instruction also includes an instruction address specifier that encodes an instruction address in main memory that is to be updated with the storage datum. The method further comprises modifying the instruction address to contain the storage datum and ensuring coherence between the modified main memory and at least one instruction cache. In at least one embodiment, the instruction is received as one of a plurality of instructions in an instruction word.

In at least one embodiment, the instruction address specifier encodes one or more address registers, with each address register containing at least a portion of the instruction address. In another embodiment, the instruction address specifier encodes an immediate address value. In another embodiment, the opcode is a particular unique bit pattern that indicates to the hardware that the storage datum is to be written to an instruction space, the instruction space including the instruction address.

At least one embodiment of the method further comprises determining whether the instruction address to be modified is already in the data cache. If so, then the proper cache line in the data cache is modified to contain the storage datum, and the storage datum is then transmitted from the data cache to the instruction address in main memory. In one embodiment, the storage datum is transmitted to the instruction address by copying the contents of the data cache line to the instruction address. In another embodiment, the storage datum is transmitted to the instruction address by moving the contents of the data cache line to the instruction address and then clearing the data cache line. In another embodiment, the method further comprises indicating, after the contents are moved from the data cache line to the instruction address, that the contents of the data cache line are no longer valid.

In another embodiment, if the contents of the instruction address are not available in the data cache, the storage datum is stored directly to the instruction address. In another embodiment, when the contents of the instruction address are not available in the data cache, the contents of the instruction address are copied from main memory to a data cache line. The contents of the data cache line are then modified to contain the storage datum, and the contents of the data cache line are then copied to the instruction address.

In at least one embodiment, the way that coherence is ensured is that the contents of a cache line in an instruction cache that corresponds to the instruction address are invalidated by broadcasting the instruction cache address to the at least one instruction cache. In another embodiment, updating the contents of the instruction cache to reflect the storage datum ensures coherence. In another embodiment, coherence is assured by allocating a new line in the instruction cache and updating the new line to contain the storage datum.

At least one embodiment of the present invention provides a processor that performs a store-to-instruction-space ("STI") instruction. The processor includes at least one functional unit, a main memory, and a module for receiving the STI instruction and executing it. In at least one embodiment, the processor includes a plurality of functional units. The STI instruction is received and executed on at least one functional unit. In at least one embodiment, the processor further comprises a data cache coupled to the main memory and an instruction cache coupled to the data cache.

The module for receiving the STI instruction and executing further comprises modules that perform the method described above.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The present invention is an STI instruction that explicitly indicates that a store instruction is being utilized to modify instruction space in a computer system, thereby providing for self-modifying software code. For clarification, an exemplary computer processor capable of executing the STI instruction is discussed below. The exemplary computer processor supports the use of data and instruction caches in a multi-thread processing environment. The discussion below of an exemplary computer processor is followed by a detailed discussion of the STI instruction itself.

Figure 1:
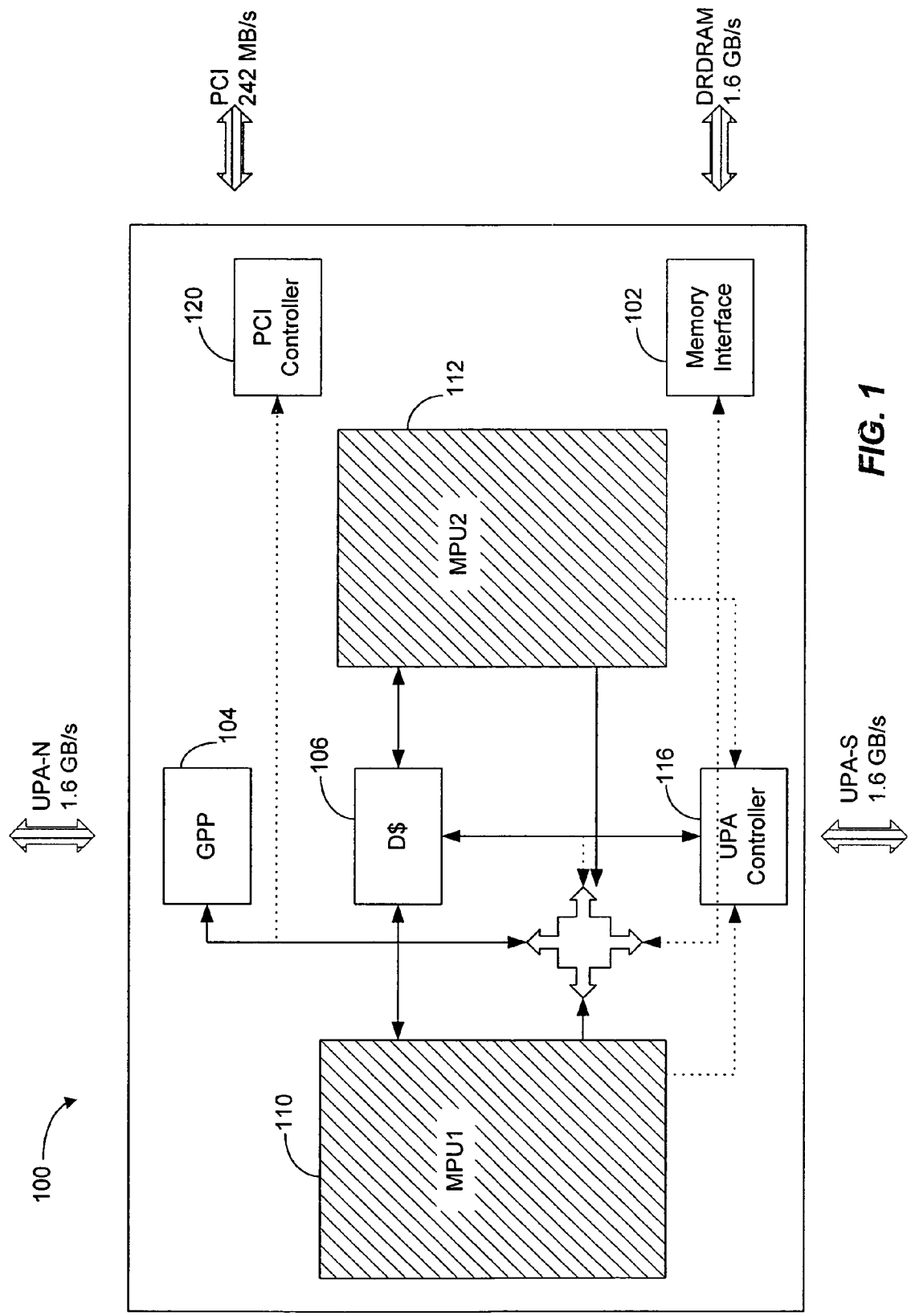
FIG. 1 is a schematic block diagram illustrating one embodiment of a multiple-thread processor.

Referring to FIG. 1, a schematic block diagram illustrates a processor 100 having an improved architecture for multiple-thread operation on the basis of a highly parallel structure including multiple independent parallel execution paths, shown herein as two media processing units 110 and 112. The execution paths execute in parallel across threads and include a multiple-instruction parallel pathway within a thread. The multiple independent parallel execution paths include functional units executing an instruction set having special data-handling instructions that are advantageous in a multiple-thread environment.

The illustrative processor 100 is depicted in FIG. 1 as also comprising interface controllers. The interface controllers include an UltraPort Architecture Interconnect (UPA) controller 116 and a peripheral component interconnect (PCI) interconnect 120. The processor also includes a memory interface 102 and a geometry decompressor (GPP) 104.

The multiple-threading architecture of the processor 100 is advantageous for usage in executing multiple-threaded applications using a language such as the Java™ language running under a multiple-threaded operating system on a multiple-threaded Java Virtual Machine™. The illustrative processor 100 includes two independent processor elements, the media processing units 110 and 112, forming two independent parallel execution paths. A language that supports multiple threads, such as the Java™ programming language generates two threads that respectively execute in the two parallel execution paths with very little overhead incurred. The special instructions executed by the multiple-threaded processor include instructions for accessing arrays, and instructions that support garbage collection.

A single integrated circuit chip implementation of a processor 100 includes two media processing units 110 and 112 and a shared data cache 106. The shared data cache 106 is a dual-ported storage that is shared among the media processing units 110 and 112 with one port allocated to each media processing unit. The data cache 106 is four-way set associative, follows a write-back protocol, and supports hits in the fill buffer (not shown). The data cache 106 allows fast data sharing and eliminates the need for a complex, error-prone cache coherency protocol between the media processing units 110 and 112.

FIG. 1 also shows a general purpose processor (GPP) 104 connected to the shared data cache 106, an Ultra Port Architecture (UPA) Controller 116, and a memory interface 102.

Figure 2:
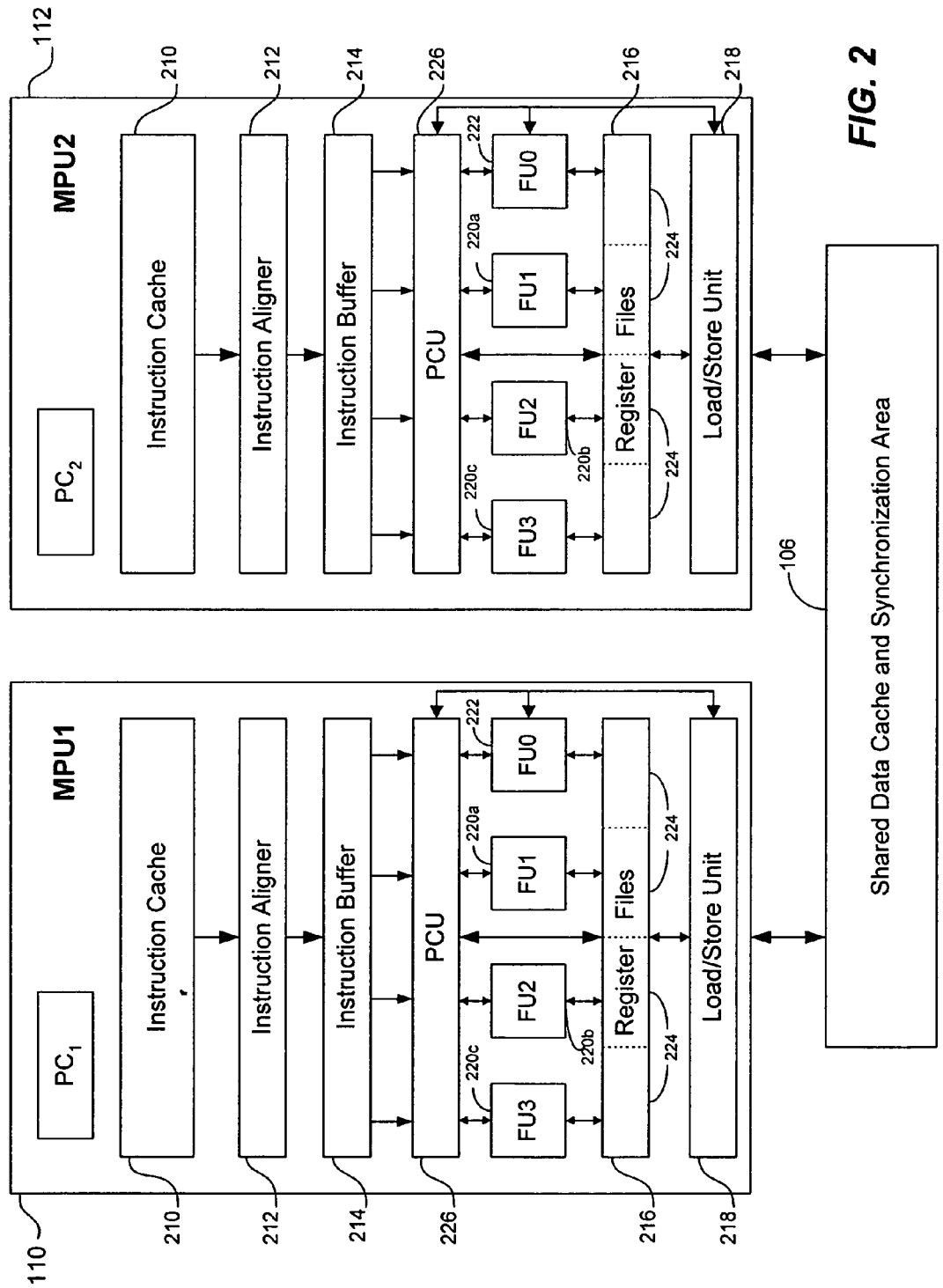
FIG. 2 is a schematic block diagram showing the core of one embodiment of a multi-thread processor.

Referring to FIG. 2, a schematic block diagram shows the core of the processor 100. Each of the media processing units 110 and 112 include a pipeline control unit 226 coupled between the instruction buffer 214 and a plurality of execution units. The media processing units 110 and 112 each include a plurality of execution units 222, 220a-220c for executing instructions and an instruction cache 210. The media processing units 110, 112 each include from two to four functional units. In at least one embodiment, the media processing units 110 and 112 include four functional units FUa 222, FU1 220a, FU2 220b and FU3 220c. FDa 222 is sometimes referred to herein as the general function unit ("GFU"). Each of the functional units 222, 220a-220b is allocated a separate segment of register files 224. Each of the media processing units 110 and 112 includes a load/store unit 218 coupled with the register files 224, the functional unit 222, and the pipeline control unit 226.

FIG. 2 also shows a Pipeline Control Unit (PCU) 226 between the instruction buffer 214 and the four functional units FU0 222, FU1 220a, FU2 220b, and FU3 220c. The register file 216 includes register file segments 224. Also shown in FIG. 2 is a Load/Store Unit 218.

Each media processing unit 110, 112 provides an individual independent parallel execution path. Each media processing unit 110, 112 has operational units including instruction supply blocks and instruction preparation blocks, functional units 220 and 222a-c, and a register file 216 that are separate and independent from the operational units of other paths of the multiple independent parallel execution path(s) provided by other functional unit(s). The instruction supply blocks include a separate instruction cache 210 for the individual independent parallel execution paths, however the multiple independent parallel execution paths share a single data cache 106 since multiple threads sometimes share data. The data cache 106 is dual-ported, allowing data access in the execution paths provided by both media processing units 110 and 112 in a single cycle. Sharing of the data cache 106 among independent processor elements 110 and 112 advantageously simplifies data handling, avoiding a need for a cache coordination protocol and the overhead incurred in controlling the protocol.

In addition to the instruction cache 210, the instruction supply blocks in an execution path include the instruction aligner 212, and the instruction buffer 214 that precisely format and align a full instruction group of multiple instructions ("instruction word") to prepare to access the register file 216. A fixed-length group of multiple instructions is called an instruction word. A variable-length group of instructions is called an "instruction packet." Although both an instruction word and an instruction packet may take up the same number of bits, not all entries in the instruction packet need necessarily contain a valid instruction. A variable-length instruction "packet" may contain an instruction for the GFU 222 as well as for one or more of the functional units FU1 through FU3 220a-c.

The functional units FU1, FU2, and FU3 220a-c are multiple single-instruction-multiple-datapath (MSIMD) media functional units ("MFU"). Each of the media functional units 220 is capable of processing parallel 16-bit components. Various parallel 16-bit operations supply the single-instruction-multiple-datapath capability for the processor 100 including add, multiply-add, shift, compare, and the like. The media functional units 220 operate in combination as tightly coupled digital signal processors (DSPs). Each media functional unit 220 has a separate and individual sub-instruction stream, but all three media functional units 220 execute synchronously so that the subinstructions progress lock-step through pipeline stages.

The general functional unit 222 is a processor capable of executing arithmetic logic unit (ALU) operations, loads and stores, branches, and various specialized and esoteric functions such as parallel power operations, reciprocal square root operations, and many others. The general functional unit 222 supports less common parallel operations such as the parallel reciprocal square root instruction.

Regarding the details of the STI instruction, it will be understood from the discussion above that the illustrative instruction cache 210 is two-way set-associative and has a 16 Kbyte capacity. The instruction cache 210 mainly relies on the new STI instruction to maintain coherence. This allows allowing dynamic optimizations through self-modifying code. Software is used to indicate that the instruction storage is being modified when modifications occur. The programmer or compiler therefore have precise knowledge that they are modifying the instruction space. The 16K capacity is suitable for performing graphic loops, other multimedia tasks or processes, and general-purpose Java™ code. Maintenance of coherence is minimally supported by hardware that implements writeback caching.

Software uses a new "Store to Instruction Space" (STI) instruction to maintain coherency with the instruction cache 210 so that the instruction caches 210 do not have to be snooped on every single store operation issued by the media processing unit 110. An aim of the present invention is to support self-modifying code while simplifying and making more efficient the processing of self-modifying code by enabling the compiler that generates the modifying code to be aware that it is doing so. In prior art systems, the compiler or the programmer uses a STORE instruction to modify data space and to modify instruction space. Because the same instruction is used to modify both data and instructions, the processor cannot differentiate between the type of space being modified by the STORE instruction. The hardware must therefore pessimistically snoop the instruction cache for each STORE instruction just in case the STORE instruction is being used to modify instruction space. With the present invention, the compiler or the programmer uses the new STI to indicate that the STORE operation is modifying an instruction.

Figure 5:
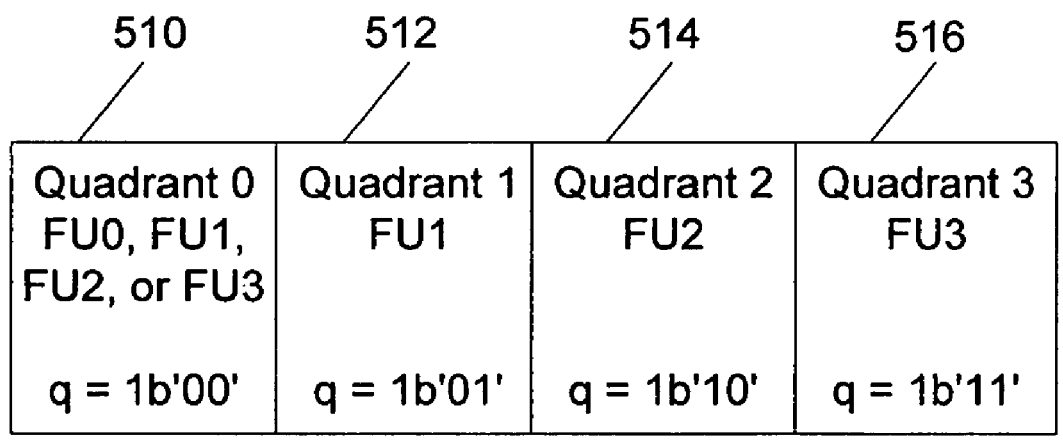
FIG. 5 illustrates an exemplary format of a variable-length instruction packet 500 for processor 100.

FIGS. 1, 2, and 5 provide background information useful to the following discussion of the STI instruction format. FIG. 5 illustrates an exemplary format of a variable-length instruction packet 500 for processor 100. Instructions for the processor 100 are 32 bits in length. The processor 100 can issue multiple instructions simultaneously, one to each of its functional units 222, 220a-220c. In a processor having four functional units 222, 220a-220c, instructions are issued in four-quadrant instruction words 500, with each quadrant 510, 512, 514, 516 corresponding to a functional unit. Each quadrant 510, 512, 514, 516 being capable of holding a 32-bit instruction, each instruction packet 500 includes 128 bits. Each instruction packet 500 is composed of one GFU instruction and zero to three MFU instructions. That is, when there isn't useful work to do on all the MFUs, MFU instructions need not be present.

Figure 3:
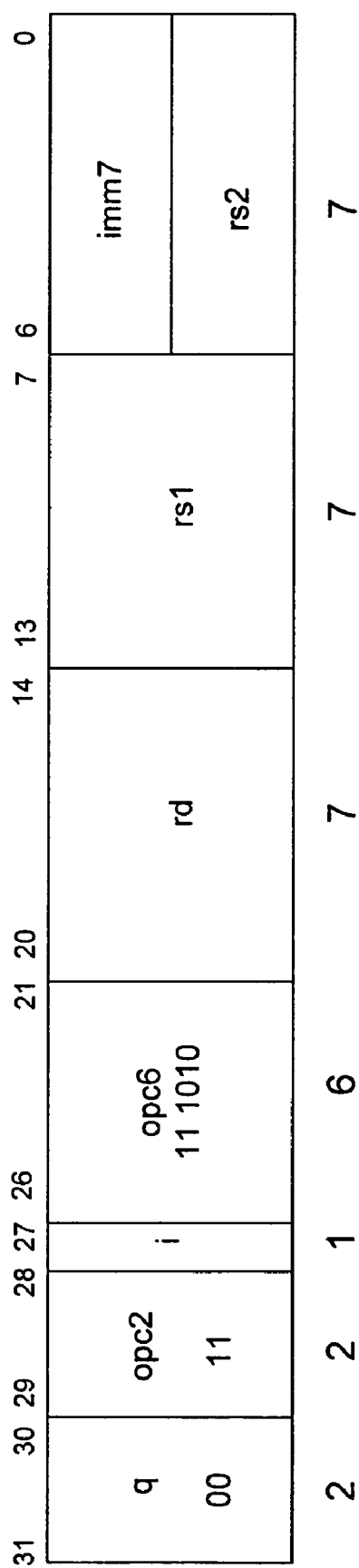
FIG. 3 illustrates the format of the STI instruction in accordance with one embodiment of the present invention.

FIG. 3 illustrates the format of an instruction for processor 100, and more particularly for the STI instruction in accordance with one embodiment of the present invention. The two most significant bits of each instruction make up a 2-bit field known as the q field, which is also called the instruction "quadrant." Each quadrant corresponds to a different functional unit. FIG. 3 illustrates that the two most significant bits of the STI instruction are 1b'00'. The STI instruction is referred to as a GFU instruction because it has a q field of 1b'00' and resides in the GFU quadrant of the instruction packet 500. A GFU instruction, including the STI instruction, can be executed on the GFU 222 or on any of the three MFU's, 220a-220c. However, instructions in the other three instruction quadrants can only be executed on FU3 220c, FU2 220b, and FU1 220a.

As explained above, a GFU instruction always resides in the GFU quadrant of the instruction word and the q field for a GFU instruction is 1b'00'. The q field values for the other three quadrants, corresponding to each of the zero to three MFU's, are set forth below in Table 1. All of the instructions in a single instruction packet are issued in the same cycle.

TABLE 1

| q field value | Instruction quadrant |
| --- | --- |
| 00 | GFU |
| 01 | MFU1 |
| 10 | MFU2 |
| 11 | MFU3 |

FIG. 3 further illustrates that the two next most significant bits, labeled as bits 29 and 28, make up a field called opc2. The contents of opc2, along with the i bit and the contents of the opc6 field discussed below, constitute the opcode for the STI instruction. Opc2 is a two-bit field that, for the STI instruction, is a value of 1b'11'. The value of 1b'11' in opc2 indicates to the media processing unit 110, 112 that the instruction is a memory access operation.

FIG. 3 illustrates that the next most significant bit in the STI instruction, labeled as bit 27, is the i bit. The i bit is a single-bit field that indicates whether the instruction includes an immediate value. When set to a value of 1b'1', the i bit value indicates that the least significant seven bits of the instruction contain an immediate value. An immediate value supplies the value of the operand itself, rather than supplying an address at which the value may be found. When reset to 1b'0', the i bit value indicates that the least significant seven bits contain a source register number, rs2.

The remaining bits of the opcode for the STI instruction reside in the opc6 field, labeled as bits 26 through 21 in FIG. 3. Bits 26 through 21 of the STI opcode comprise "111010.

Bits 20 through 14 of the STI instruction make up the rd field. The rd field is a seven-bit field that encodes a general purpose register number. In execution of the STI instruction, the data to be stored to instruction space is obtained from the register number encoded in the rd field.

Bits 13 through 7 make up the rs1 field. The rs1 field is a seven-bit field that encodes a general-purpose register number. In execution of the STI instruction, the effective instruction-space address to be modified is calculated, in part, from the contents of the register-number encoded in the rs1 field.

The calculation of the effective instruction-space address to be modified also involves the contents of bits 6 through 9 of the STI instruction. The bits 6 through 0 may contain either a register number or an immediate value that will be zero-extended when used. That is, bits 6 through 0 can make up either the rs2 field or the uimm7 field, respectively In either case, the contents of bits 6 through 0 are used in execution of the STI instruction to generate the effective address in instruction space that is to be altered by the STI instruction.

The value of the i bit dictates how the media processing unit 110, 112 will calculate the effective address of the instruction space to be modified. If the i bit contains a value of 1b'1', then bits 6 through 0 will be treated as a uimm7 field. Using the contents of the uimm7 field, the media processing unit calculates the effective address as "R[rs1]+zero_ext(uimm7×4)". The immediate value in the uimm7 field is scaled by the size of the store (4 bytes) being performed. It is then zero-extended before it is added to the address portion residing in register R[rs1] to calculate the effective address.

If the i bit contains a value of 1b'0', then bits 6 through 0 are treated as an rs2 field. In such case the address portions residing in the register numbers encoded in rs1 and rs2 are combined to generate the effective address. When the value of the i bit is 1b'0', the effective address is therefore calculated as "R[rs1]+R[rs2]".

The STI instruction illustrated in FIG. 3 stores one word of data from the register specified by register rd to the indicated instruction space address. Specifically, the media processing unit 110, 112 executing a Store Register to Instruction Memory (STI) instruction stores a word from the general-purpose register number encoded in rd, that is, from R[rd], to the effective memory address encoded in bits 13 through 0. The STI.W instruction uses a two-component effective address specification for the instruction space address. The effective address may be [rs1+rs2] or [rs1+imm7]. In an alternative embodiment, the effective address may also be [rs1]. In either embodiment, rs1 and rs2 are each registers that contain 7-bit portions of the effective address and imm7 is a 7-bit immediate address. When [rs1] is specified, the processor 100 infers an immediate zero for the second address component for the instruction. The use of an immediate value for the second component of the address sets the i-bit of the opcode.

The STI instruction guarantees consistency between memory and the instruction cache. Execution of the STI instruction ensures that the instruction cache remains consistent with the value stored to memory.

Because it stores one word of data, the preferred nomenclature uses an extension of an optional period followed by "W". The instruction may therefore be written as "STI.W" or "STIW". One skilled in the art will appreciate that, while the preferred embodiment stores one 4-byte word of data, the STI instruction may be implemented to operate on alternative sizes of data that are larger or smaller than a 4-byte word, such as a single 8-bit byte, a 2-byte halfword, and an 8-byte doubleword.

Figure 4:
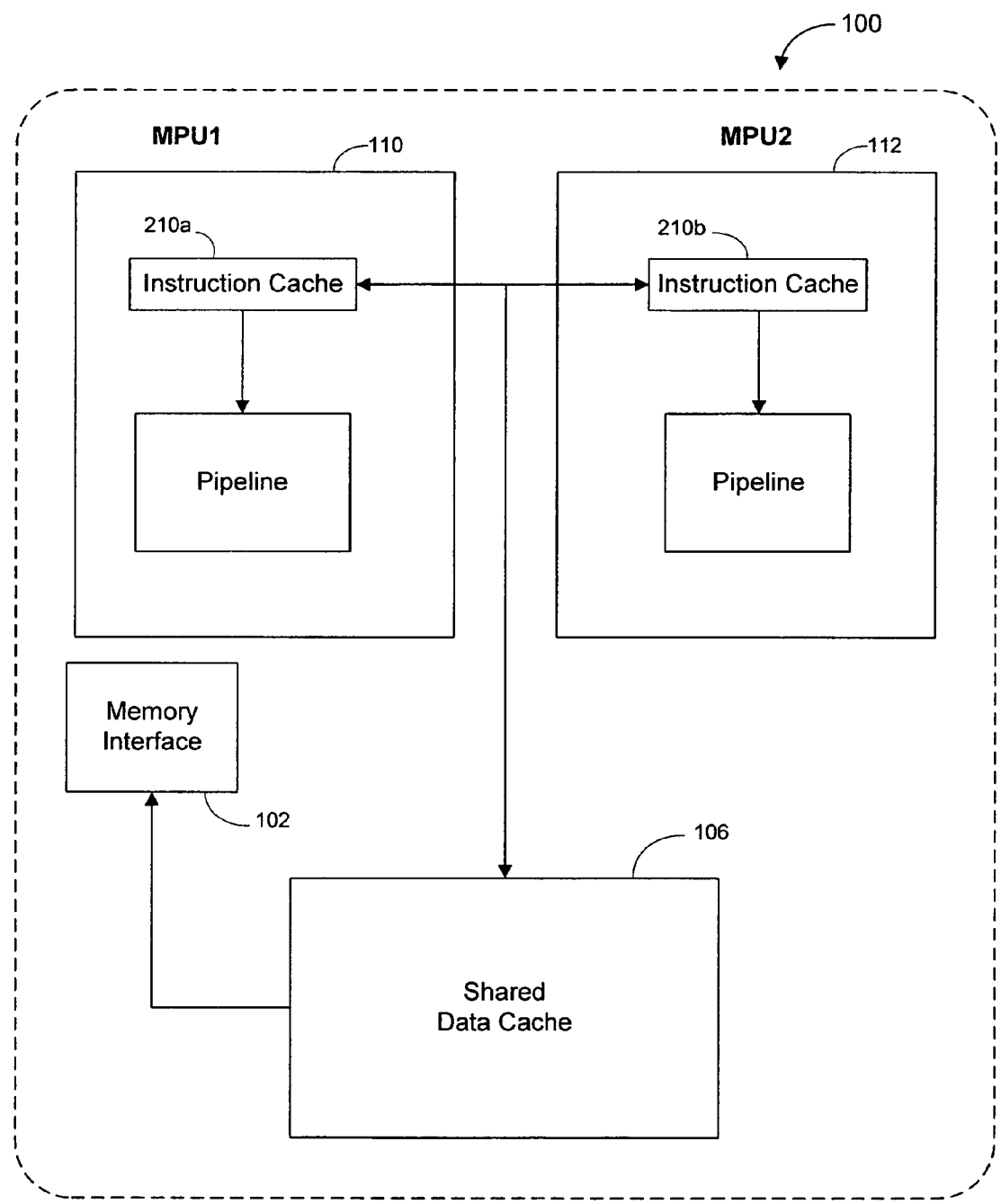
FIG. 4 is a schematic block diagram that illustrates the data flow in an STI instruction.

As shown in FIG. 4, the processor 100 can include a memory interface 102 connected to the shared data cache 106, and the media processing units 110, 112 respectively include instruction caches 210a, 210b.

FIG. 4 illustrates the data flow resulting from the STI.W instruction. For purposes of illustration, this discussion assumes that MPU1 110 is processing the STI.W instruction. First, MPU1 110 must determine whether the instruction line to be modified is already in the data cache 106. MPU1 110 therefore first checks to determine if the cache line containing the data addressed by bits 13-0 of the STI.W instruction is already in the data cache. If so, then the data cache line is updated with the data in R[rd]. Once the update has occurred, the data must be transmitted from the data cache to the proper instruction memory address. This may be accomplished one of two ways. The entire data cache line that has been updated is copied to the proper instruction address in main memory. Alternatively, the entire data cache line that has been updated is moved to the proper instruction address in main memory and may be cleared from the data cache. Under the alternative approach, the line in the data cache is now "invalid" after its contents is moved to main memory.

If the cache line containing the data addressed by bits 13-0 of the STI.W instruction is not already in the data cache, then one of two approaches may be followed to store the data in R[rd] to the instruction address in main memory. In the first approach, the data from R[rd] is sent directly to the address in main memory that is encoded in bits 13-0 of the STI instruction. Alternatively, the second approach has three steps. First, the instruction line addressed by bits 13-0 of the STI.W instruction is brought from main memory into the data cache. The line in the data cache is then updated with the data in R[rd]. Finally, the entire data cache line that has been updated is copied to the correct instruction address in main memory.

A final stage in the execution of the STI.W instruction is to ensure coherence between main memory and the instruction cache. This may be accomplished according to one of several alternative embodiments. In the first embodiment, any line in the instruction cache that could contain the "line of interest" (i.e., the instruction line whose effective address is specified in bits 13-0 of the STI.W instruction) is invalidated. In a second embodiment, an instruction cache line is invalidated only if it does indeed contain the line of interest. In a third embodiment, coherence is achieved by "installing" or allocating a new line in the instruction cache, the new line containing the data specified in R[rd]. In a final alternative embodiment, if the cache line that was updated in main memory is also in the instruction cache, then the line in the instruction cache is updated with the data in R[rd].

If one of the invalidation approaches is followed, the invalidation is accomplished as follows. The effective address of the instruction cache line to be invalidated (that is, the line whose effective address is specified in bits 13-0 of the STI.W instruction) is broadcast to the instruction cache 210 in each MPU 110, 112, respectively instruction cache 210a and 210b. Broadcasting the address to each MPU 110, 112 facilitates invalidation of the instruction address in both instruction caches 210 and thus keeps the instruction caches coherent with main memory.

To summarize, the preceding discussion illustrates that an explicit instruction that functions to modify code provides an advantage over prior art systems that do not have an explicit instruction for storing data to instruction space in main memory 102. In prior art systems there is no indication whether or not the STORE instruction is to modify an instruction, and the processor must therefore be implemented to always assume that any STORE instruction might feasibly do so. In such case, the computer system must check, for every STORE instruction, to see if the line to be modified is an instruction in the instruction cache 210. The STI instruction of the present invention eliminates such inefficiency, and the instruction cache 210 need not be snooped when processing a traditional STORE instruction.

Although particular embodiments of the present invention have been shown and described, it will be obvious to those skilled in the art that changes and modifications can be made without departing from the present invention in its broader aspects. For example, the present invention is not limited by any particular processor architecture, the presence or structure of caches or memory, or the number of bits in any register or memory location. The appended claims are to encompass within their scope all such changes and modifications that fall within the true scope of the present invention.

What is claimed is:

1. A method for self-modifying code comprising:
distinguishing between a store-to-data-space instruction and a store-to-instruction-space instruction in an execution sequence of instructions;
executing the store-to-data-space instruction to update a data space target in a memory shared amongst a plurality of processing units that each has a separate instruction cache;
executing the store-to-instruction-space instruction to update an instruction space target in the shared memory;
ensuring coherency between the instruction caches and the shared memory without snooping traffic that corresponds to a store-to-data-space instruction; and
at least one of:
updating a location in a data cache incident to the executing the store-to-instruction-space instruction when the location hosts content at an instruction space target indicated by the store-to-instruction-space instruction, wherein the data cache is accessible to the plurality of processing units;
bypassing the data cache and writing directly to the shared memory incident to the executing the store-to-instruction-space instruction when the data cache does not represent an instruction space target indicated by the store-to-instruction-space instruction; or
incident to the executing the store-to-instruction-space instruction wherein the store-to-instruction-space instructions indicates the instruction space target and new content, when the location in the data cache does not host content at the instruction space target, then copying content from the instruction space target to the location in the data cache, updating the data cache location with the new content, and copying the new content to the instruction space target from the data cache location.

2. The method of claim 1, wherein the instruction space and the data space are commingled in the shared memory.

3. The method of claim 1, wherein the ensuring coherency comprises:
broadcasting the instruction space target to at least one of the plurality of processing units incident to execution of the store-to-instruction-space instruction; and
invalidating a location in the instruction cache of the at least one of the plurality of processing units that corresponds to the instruction space target.

4. The method of claim 3, wherein the invalidated instruction cache location hosts content of the instruction space target.

5. The method of claim 1, wherein the ensuring coherency comprises installing a new line in at least one of the instruction caches of a first of the plurality of processing units incident to a second of the processing units executing the store-to-instruction-space instruction.

6. The method of claim 1, wherein the ensuring coherency comprises updating a line in at least one of the instruction caches of a first of the plurality of processing units incident to a second of the processing units executing the store-to-instruction-space instruction, wherein the line corresponds to the instruction space target.

7. The method of claim 1, comprising updating the location in a data cache incident to the executing the store-to-instruction-space instruction when the location hosts content at an instruction space target indicated by the store-to-instruction-space instruction, wherein the data cache is accessible to the plurality of processing units.

8. The method of claim 1, comprising bypassing the data cache and writing directly to the shared memory incident to the executing the store-to-instruction-space instruction when the data cache does not represent an instruction space target indicated by the store-to-instruction-space instruction.

9. The method of claim 1, comprising:
incident to the executing the store-to-instruction-space instruction wherein the store-to-instruction-space instructions indicates the instruction space target and new content, when the location in the data cache does not host content at the instruction space target, then copying content from the instruction space target to the location in the data cache, updating the data cache location with the new content, and copying the new content to the instruction space target from the data cache location.

10. An apparatus comprising:
a memory operable to commingle data and instruction information in a single address space;
a first processing unit and a second processing unit coupled to share the memory, each of the processing units having an instruction cache and each being adapted to execute both a store-to-data-space instruction and a store-to-instruction-space instruction, and ensure coherence between the respective instruction caches and the shared memory without snooping traffic that corresponds to a store-to-data-space instruction; and
a data cache, wherein the processing units are adapted to update a location in the data cache incident to executing an instance of the store-to-instruction-space instruction when the location hosts content at an instruction space target indicated by the store-to-instruction-space instruction instance.

11. The apparatus of claim 10, wherein the processing units being adapted to ensure coherence comprises the processing units being adapted to broadcast an instruction space target indicated by an instance of the store-to-instruction-space instruction incident to execution of the store-to-instruction-space instruction instance and adapted to invalidate a location in their respective instruction caches after receiving the broadcast.

12. The apparatus of claim 10, wherein the processing units being adapted to ensure coherence comprises the processing units being adapted to install new lines in respective instruction caches thereof incident to execution of an instance of the store-to-instruction-space instruction.

13. The apparatus of claim 10, wherein the processing units being adapted to ensure coherence comprises the processing units being adapted to update corresponding lines in respective instruction caches thereof incident to execution of an instance of the store-to-instruction-space instruction.

14. The apparatus of claim 10 further comprising an address bus coupled to the shared memory and the first and second processing units.

15. The apparatus of claim 10 further comprising a network interface.

16. An apparatus comprising:
a memory operable to commingle data and instruction information in a single address space; a first processing unit and a second processing unit coupled to share the memory, each of the processing units having an instruction cache and each being adapted to execute both a store-to-data-space instruction and a store-to-instruction-space instruction, and ensure coherence between the respective instruction caches and the shared memory without snooping traffic that corresponds to a store-to-data-space instruction; and
a data cache, wherein the processing units are adapted to bypass the data cache and write directly to the memory incident to executing an instance of the store-to-instruction-space instruction when the data cache does not represent an instruction space target indicated by the store-to-instruction-space instruction instance.

17. An apparatus comprising:
a memory operable to commingle data and instruction information in a single address space; a first processing unit and a second processing unit coupled to share the memory, each of the processing units having an instruction cache and each being adapted to execute both a store-to-data-space instruction and a store-to-instruction-space instruction, and ensure coherence between the respective instruction caches and the shared memory without snooping traffic that corresponds to a store-to-data-space instruction; and
a data cache,
wherein, incident to executing an instance of the store-to-instruction-space instruction that indicates an instruction space target and new content, the processing units are adapted to,
when a location in the data cache does not host content at the instruction space target, copy content from the instruction space target to a location in the data cache,
update the data cache location with the new content, and
copy the new content to the instruction space target from the data cache location.

18. A computer program product encoded on one or more computer-readable storages, the computer program product comprising:
at least one instance of a store-to-data-space instruction executable to write to a target in data space in a shared memory, the first instruction type including an opcode, a data space target specifier, and a source specifier; and
at least one instance of a store-to-instruction-space instruction executable to write to a target in instruction space in the shared memory, the second instruction type including an instruction space target specifier, a source specifier, and an opcode to distinguish the store-to-instruction-space instruction from the store-to-data-space instruction,
wherein data space targets and instruction space targets are commingled in the shared memory; and
wherein the computer program product further comprises executable instructions for causing a computer to perform at least one of:
updating a location in a data cache incident to execution of the store-to-instruction-space instruction when the location hosts content at the instruction space target, wherein the data cache is accessible to a plurality of processing units;
bypassing the data cache and writing directly to the shared memory incident to execution of the store-to-instruction-space instruction when the data cache does not represent the instruction space target; or
incident to execution of the store-to-instruction-space instruction wherein the store-to-instruction-space instructions indicates the instruction space target and new content, when the location in the data cache does not host content at the instruction space target, then copying content from the instruction space target to the location in the data cache, updating the data cache location with the new content, and copying the new content to the instruction space target from the data cache location.

19. The computer program product of claim 18, wherein the instruction space target specifier of the store-to-instruction-space instruction encodes at least a portion of an address for a location in instruction space.

20. The computer program product of claim 18, wherein the source specifier encodes at least one of a source register, a location in an instruction cache, one or more immediate values, or a location in the shared memory.

21. The computer program product of claim 18, comprising executable instructions for causing a computer to perform:
updating a location in a data cache incident to execution of the store-to-instruction-space instruction when the location hosts content at the instruction space target, wherein the data cache is accessible to a plurality of processing units.

22. The computer program product of claim 18, comprising executable instructions for causing a computer to perform:
bypassing the data cache and writing directly to the shared memory incident to execution of the store-to-instruction-space instruction when the data cache does not represent the instruction space target.

23. The computer program product of claim 18, comprising executable instructions for causing a computer to perform:
incident to execution of the store-to-instruction-space instruction wherein the store-to-instruction-space instructions indicates the instruction space target and new content, when the location in the data cache does not host content at the instruction space target, then copying content from the instruction space target to the location in the data cache, updating the data cache location with the new content, and copying the new content to the instruction space target from the data cache location.

* * * * *